United States Patent
Fujishiro et al.

(10) Patent No.: US 10,154,518 B2
(45) Date of Patent: Dec. 11, 2018

(54) COMMUNICATION CONTROL METHOD, BASE STATION, AND USER TERMINAL

(71) Applicant: KYOCERA CORPORATION, Kyoto (JP)

(72) Inventors: Masato Fujishiro, Yokohama (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 8 days.

(21) Appl. No.: 15/032,490

(22) PCT Filed: Oct. 21, 2014

(86) PCT No.: PCT/JP2014/077928
§ 371 (c)(1),
(2) Date: Apr. 27, 2016

(87) PCT Pub. No.: WO2015/064419
PCT Pub. Date: May 7, 2015

(65) Prior Publication Data
US 2016/0255658 A1    Sep. 1, 2016

(30) Foreign Application Priority Data

Oct. 29, 2013  (JP) ................................. 2013-224461

(51) Int. Cl.
*H04W 16/30* (2009.01)
*H04W 72/04* (2009.01)
(Continued)

(52) U.S. Cl.
CPC ....... *H04W 74/0833* (2013.01); *H04W 16/32* (2013.01); *H04W 72/0453* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 2012/0300714 A1* | 11/2012 | Ng | .................... | H04W 56/0045 370/329 |
| 2013/0010722 A1* | 1/2013 | Suzuki | .................. | H04L 1/1854 370/329 |
| 2014/0086213 A1* | 3/2014 | Kwon | ............... | H04W 36/0055 370/331 |

FOREIGN PATENT DOCUMENTS

| | | |
|---|---|---|
| WO | 2012/169840 A2 | 12/2012 |
| WO | 2013/096616 A1 | 6/2013 |
| WO | 2013/140240 A1 | 9/2013 |

OTHER PUBLICATIONS

International Search Report issued in PCT/JP2014/077928; dated Jan. 27, 2015.

(Continued)

*Primary Examiner* — Noel R Beharry
*Assistant Examiner* — Nicole King
(74) *Attorney, Agent, or Firm* — Studebaker & Brackett PC

(57) ABSTRACT

A communication control method used in a mobile communication system in which a UE 100 is capable of simultaneously using a plurality of cells. The communication control method comprises the steps of: transmitting a PRACH securing request to request a securing of a PRACH resource, from a cell 1 having a connection with the UE 100 to a cell 2 having no connection with the UE 100; securing, by the cell 2 that receives the PRACH securing request, the PRACH resource; and transmitting a random access preamble by using the PRACH resource, from the UE 100 to the cell 2.

4 Claims, 7 Drawing Sheets

(51) Int. Cl.
H04W 74/08 (2009.01)
H04W 16/32 (2009.01)
H04W 88/02 (2009.01)
H04W 88/08 (2009.01)

(56) References Cited

OTHER PUBLICATIONS

Written Opinion issued in PCT/JP2014/077928; dated Jan. 27, 2015.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; 3GPP TS 36.300 V11.7.0; Sep. 2013; pp. 1-209; Release 11; 3GPP Organizational Partners.
Extended European Search Report (EESR) dated Jun. 1, 2017, from corresponding EP Appl No. 14857593.9, 8 pp.

\* cited by examiner

COMMUNICATION CONTROL METHOD, BASE STATION, AND USER TERMINAL

TECHNICAL FIELD

The present invention relates to a communication control method, a base station, and a user terminal, used in a mobile communication system.

BACKGROUND ART

In LTE (Long Term Evolution), specifications of which have been designed in 3GPP (3rd Generation Partnership Project) which is a project aiming to standardize a mobile communication system, a user terminal executes a random access procedure for establishing a connection with a cell.

Further, in the 3GPP Release 10 and thereafter, a carrier aggregation is supported where a user terminal simultaneously uses a plurality of component carriers (plurality of cells) to perform communication. In the carrier aggregation, a cell that performs mobility control of a user terminal is called a primary cell (Pcell), and an auxiliary cell with which to form a pair with the Pcell is called a secondary cell (SCell).

CITATION LIST

Non Patent Literature

[NPL 1] 3GPP Technical Specification "TS 36.300 V11.7.0" September, 2013

SUMMARY OF INVENTION

In the above-described random access procedure, a random access preamble is firstly transmitted on a physical random access channel (PRACH) from the user terminal to the cell.

Thus, it is necessary for each cell in the mobile communication system to ensure a time-frequency resource (PRACH resource), used as the PRACH, so as to receive the random access preamble.

However, there is a problem that when the PRACH resource is ensured, the time-frequency resource (PRACH resource) used as a physical uplink shared channel (PUSCH) through which uplink user data is transmitted decreases.

Therefore, an object of the present invention is to improve efficiency in a random access procedure by an inter-cell cooperation.

A communication control method according to a first aspect is used in a mobile communication system in which a user terminal is capable of simultaneously using a plurality of cells. The communication control method comprises the steps of transmitting a PRACH securing request to request a securing of a PRACH resource, from a first cell having a connection with the user terminal to a second cell having no connection with the user terminal; securing, by the second cell that receives the PRACH securing request, the PRACH resource; and transmitting a random access preamble by using the PRACH resource, from the user terminal to the second cell.

A base station according to a second aspect manages a first cell having a connection with the user terminal in a mobile communication system in which a user terminal is capable of simultaneously using a plurality of cells. The base station comprises a transmitter configured to transmit a PRACH securing request to request a securing of a PRACH resource, to a second cell having no connection with the user terminal.

A base station according to a third aspect manages a second cell having no connection with the user terminal in a mobile communication system in which a user terminal is capable of simultaneously using a plurality of cells. The base station comprises a receiver configured to receive a PRACH securing request to request a securing of a PRACH resource, from a first cell having a connection with the user terminal; and a controller configured to secure the PRACH resource in the second cell, in response to reception of the PRACH securing request.

A user terminal according to a fourth aspect is a user terminal having a connection with a first cell and having no connection with a second cell in a mobile communication system in which the user terminal is capable of simultaneously using a plurality of cells. The user terminal comprises a transmitter configured to transmit, a random access preamble, to the second cell, by using a PRACH resource secured by the second cell in response to a PRACH securing request from the first cell.

DESCRIPTION OF EMBODIMENTS

Overview of Embodiments

Figure 1:
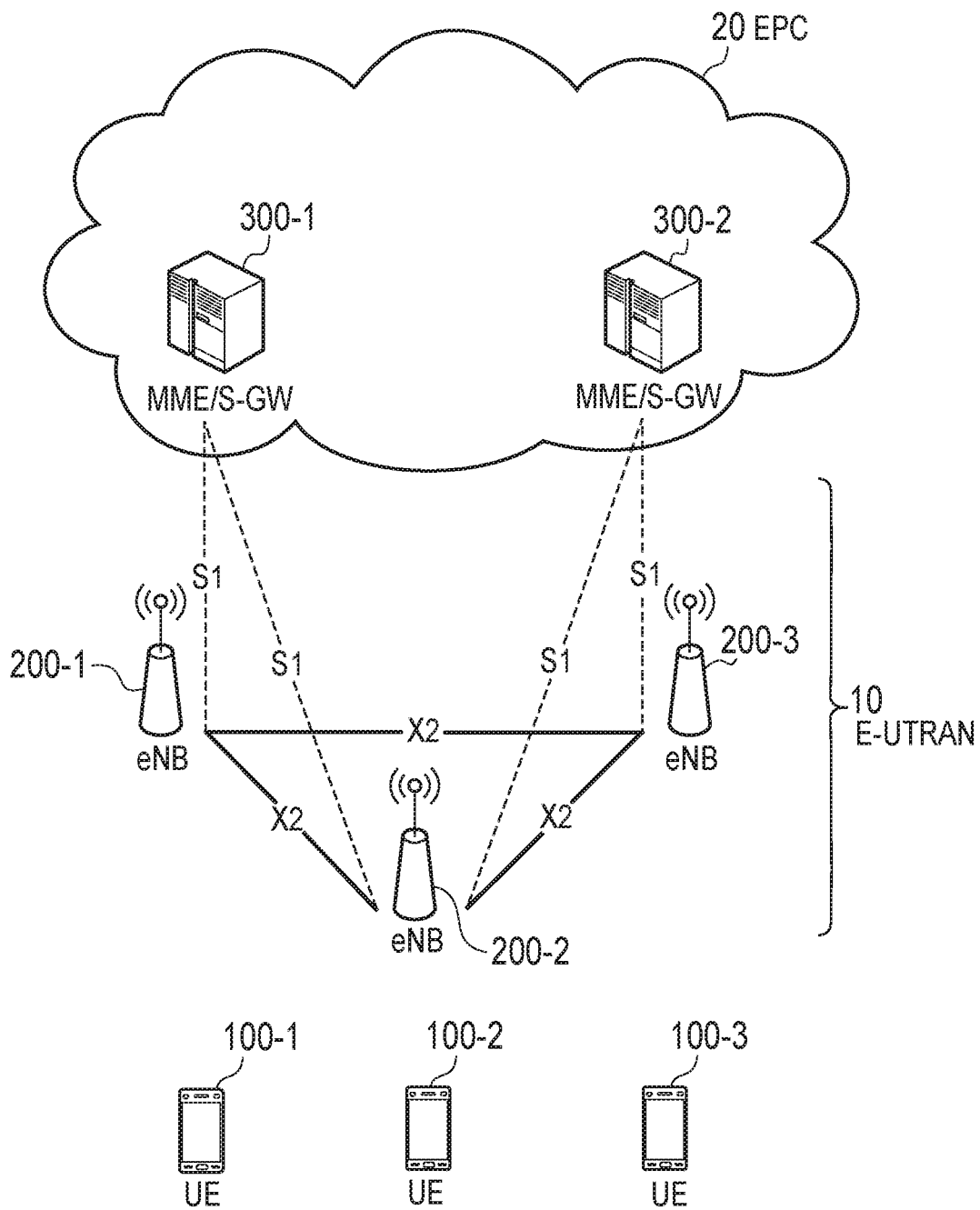
FIG. 1 is a configuration diagram of an LTE system according to an embodiment and a second embodiment.

A communication control method according to embodiments is used in a mobile communication system in which a user terminal is capable of simultaneously using a plurality of cells. The communication control method comprises the steps of: transmitting a PRACH securing request to request a securing of a PRACH resource, from a first cell having a connection with the user terminal to a second cell having no connection with the user terminal; securing, by the second cell that receives the PRACH securing request, the PRACH resource; and transmitting a random access preamble by using the PRACH resource, from the user terminal to the second cell.

In the embodiments, the communication control method further comprises the step of using, by the second cell, the PRACH resource for an application other than the random access procedure until the second cell secures the PRACH resource in response to the PRACH securing request.

In the embodiments, the communication control method further comprises the steps of: assigning a sequence of the random access preamble from the first cell to the user terminal; notifying, from the first cell, the second cell of the sequence to be assigned to the user terminal; transmitting, by the second cell that receives, from the user terminal, the random access preamble having a sequence that matches the notified sequence, a first random access response, to the first cell; and transmitting, by the first cell that receives the first random access response, a second random access response, to the user terminal.

In the embodiments, in the step of notifying the sequence, by including the sequence assigned to the user terminal in the PRACH securing request, the sequence is notified from the first cell to the second cell.

In the embodiments, the communication control method further comprising the steps of; transmitting a PRACH release request to request a release of the PRACH resource, from the first cell to the second cell that secures the PRACH resource; and releasing, by the second cell that receives the PRACH release request, the PRACH resource.

In the embodiments, the communication control method further comprising the step of; releasing, by the second cell that secures the PRACH resource, the PRACH resource after an elapse of a predetermined time since securing the PRACH resource in response to the PRACH securing request.

In the embodiments, the PRACH securing request includes information designating the predetermined time.

In the embodiments, the mobile communication system supports a carrier aggregation. The first cell is a primary cell that performs mobility control of the user terminal. The second cell is one or a plurality of secondary cells, where the second cell is an auxiliary cell that forms a pair with the primary cell.

In the embodiments, the first cell is a macro cell. The second cell is one or a plurality of small cells located within a coverage of the macro cell.

In the embodiments, the mobile communication system supports a dual connectivity. The macro cell is managed by a first base station that performs mobility control of the user terminal. The small cell is managed by a second base station.

A base station according to the embodiments manages a first cell having a connection with the user terminal in a mobile communication system in which a user terminal is capable of simultaneously using a plurality of cells. The base station comprises a transmitter configured to transmit a PRACH securing request to request a securing of a PRACH resource, to a second cell having no connection with the user terminal.

A base station according to the embodiments manages a second cell having no connection with the user terminal in a mobile communication system in which a user terminal is capable of simultaneously using a plurality of cells. The base station comprises a receiver configured to receive a PRACH securing request to request a securing of a PRACH resource, from a first cell having a connection with the user terminal; and a controller configured to secure the PRACH resource in the second cell, in response to reception of the PRACH securing request.

A user terminal according to the embodiments is a user terminal having a connection with a first cell and having no connection with a second cell in a mobile communication system in which the user terminal is capable of simultaneously using a plurality of cells. The user terminal comprises a transmitter configured to transmit, a random access preamble, to the second cell, by using a PRACH resource secured by the second cell in response to a PRACH securing request from the first cell.

Embodiment

Hereinafter, an embodiment will be described using an example of LTE system.

(System Configuration)

FIG. 1 is a configuration diagram of an LTE system according to a first embodiment.

As illustrated in FIG. 1, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a user terminal. The UE 100 is a mobile communication device and performs radio communication with a cell (a serving cell). Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface. Configuration of the eNB 200 will be described later.

The eNB 200 manages one or a plurality of cells and performs radio communication with the UE 100 which establishes a connection with the cell of the eNB 200. The eNB 200 has a radio resource management (RRM) function, a routing function for user data, and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer user data. MME/S-GW 300 is connected to eNB 200 via an S1 interface.

Figure 2:
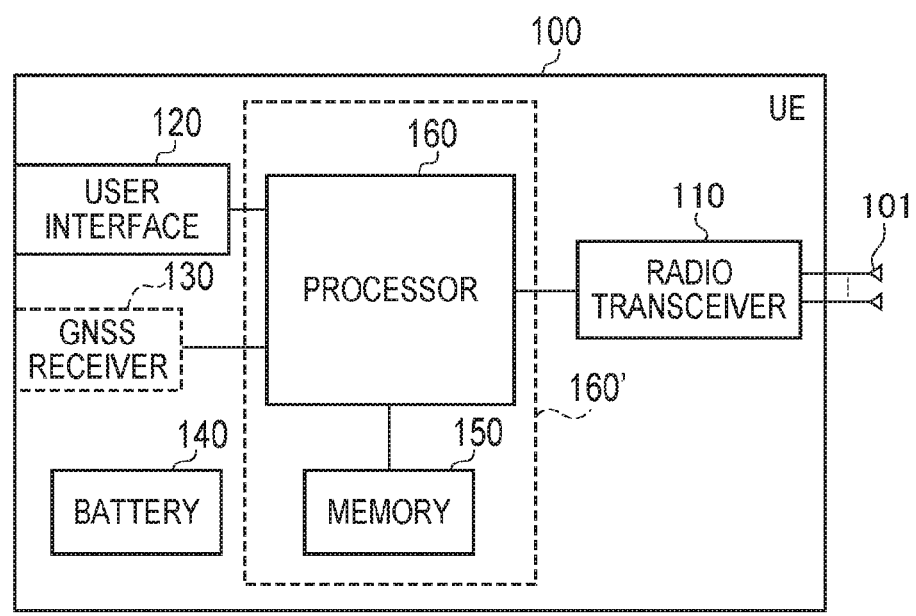
FIG. 2 is a block diagram of a UE according to the embodiment and the second embodiment.

FIG. 2 is a block diagram of the UE 100. As illustrated in FIG. 2, the UE 100 includes plural antennas 101, a radio transceiver 110, a user interface 120, a GNSS (Global Navigation Satellite System) receiver 130, a battery 140, a memory 150, and a processor 160. The memory 150 corresponds to a storage unit. The processor 160 and the memory 150 constitute a controller. The UE 100 may not have the GNSS receiver 130. Furthermore, the memory 150 may be integrally formed with the processor 160, and this set (that is, a chip set) may be called a processor 160'.

The plural antennas 101 and the radio transceiver 110 are used to transmit and receive a radio signal. The radio transceiver 110 converts a baseband signal (a transmission signal) output from the processor 160 into the radio signal and transmits the radio signal from the antenna 101. Furthermore, the radio transceiver 110 converts a radio signal received by the antenna 101 into a baseband signal (a received signal), and outputs the baseband signal to the processor 160.

The user interface 120 is an interface with a user carrying the UE 100, and includes, for example, a display, a microphone, a speaker, various buttons and the like. The user interface 120 accepts an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal, and CPU (Central Processing Unit) that performs various processes by executing the program stored in the memory 150. The processor 160 may further include a codec that performs encoding and decoding on sound and video signals. The processor 160 executes various processes and various communication protocols described later.

Figure 3:
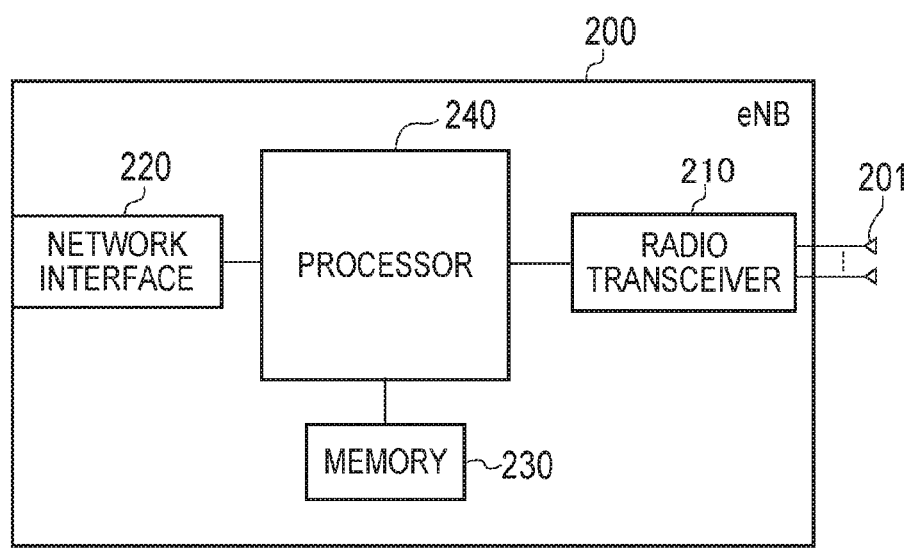
FIG. 3 is a block diagram of an eNB according to the embodiment and the second embodiment.

FIG. 3 is a block diagram of the eNB 200. As illustrated in FIG. 3, the eNB 200 includes plural antennas 201, a radio transceiver 210, a network interface 220, a memory 230, and a processor 240. The memory 230 and the processor 240 constitute a controller.

The plural antennas 201 and the radio transceiver 210 are used to transmit and receive a radio signal. The radio transceiver 210 converts a baseband signal (a transmission signal) output from the processor 240 into the radio signal and transmits the radio signal from the antenna 201. Furthermore, the radio transceiver 210 converts a radio signal received by the antenna 201 into a baseband signal (a received signal), and outputs the baseband signal to the processor 240.

The network interface 220 is connected to the neighboring eNB 200 via the X2 interface and is connected to the MME/S-GW 300 via the S1 interface. The network interface 220 is used in communication over the X2 interface and communication over the S1 interface.

The memory 230 stores a program to be executed by the processor 240 and information to be used for a process by the processor 240. The processor 240 includes a baseband processor that performs modulation and demodulation, encoding and decoding and the like on the baseband signal and CPU that performs various processes by executing the program stored in the memory 230. The processor 240 executes various processes and various communication protocols described later.

Figure 4:
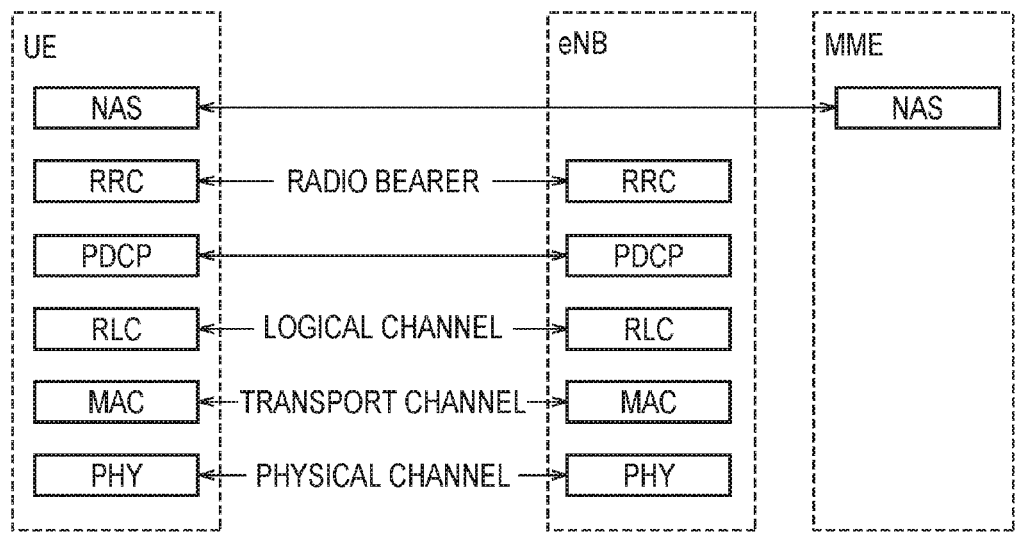
FIG. 4 is a protocol stack diagram of a radio interface in an LTE system.

FIG. 4 is a protocol stack diagram of a radio interface in the LTE system. As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, use data and control signal are transmitted via the physical channel.

The MAC layer performs priority control of data, a retransmission process by hybrid ARQ (HARQ), random access procedure when establishing RRC connection, and the like. Between the MAC layer of the UE 100 and the MAC layer of the eNB 200, user data and control signal are transmitted via a transport channel. The MAC layer of the eNB 200 includes a scheduler that determines a transport format of an uplink and a downlink (a transport block size and a modulation and coding scheme) and a resource block to be assigned to the UE 100. More information about the random access procedure will be described later.

The RLC layer transmits data to an RLC layer of a reception side by using the functions of the MAC layer and the PHY layer. Between the RLC layer of the UE 100 and the RLC layer of the eNB 200, user data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, control message (RRC messages) for various types of configuration are transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in an RRC connected state, otherwise the UE 100 is in an RRC idle state.

A NAS (Non-Access Stratum) layer positioned above the RRC layer performs a session management, a mobility management and the like.

Figure 5:
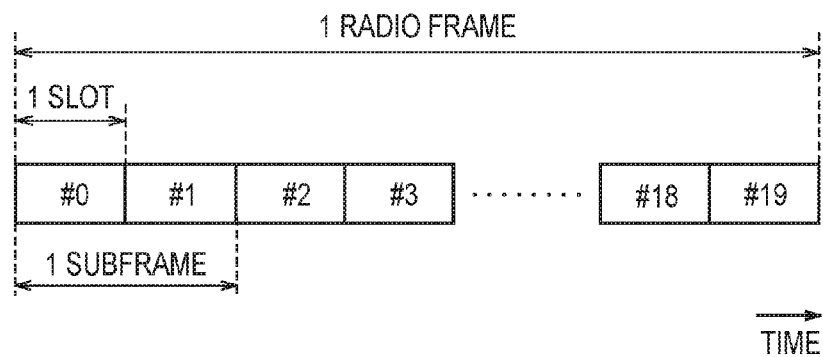
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction. Among radio resources (time-frequency resources) assigned to the UE 100, a frequency resource can be specified by a resource block and a time resource can be specified by a subframe (or slot).

In the downlink, an interval of several symbols at the head of each subframe is a control region used as a physical downlink control channel (PDCCH) for mainly transmitting a control signal. Furthermore, the other interval of each subframe is a region available as a physical downlink shared channel (PDSCH) for mainly transmitting user data.

In the uplink, both ends in the frequency direction of each subframe are control regions used as a physical uplink control channel (PUCCH) for mainly transmitting a control signal. Furthermore, in a predetermined subframe, six resource blocks in the center of the frequency direction are a region available as physical random access channel (PRACH) for transmitting a random access preamble. The other portion of each subframe is a region available as a physical uplink shared channel (PUSCH) for mainly transmitting user data.

Figure 6:
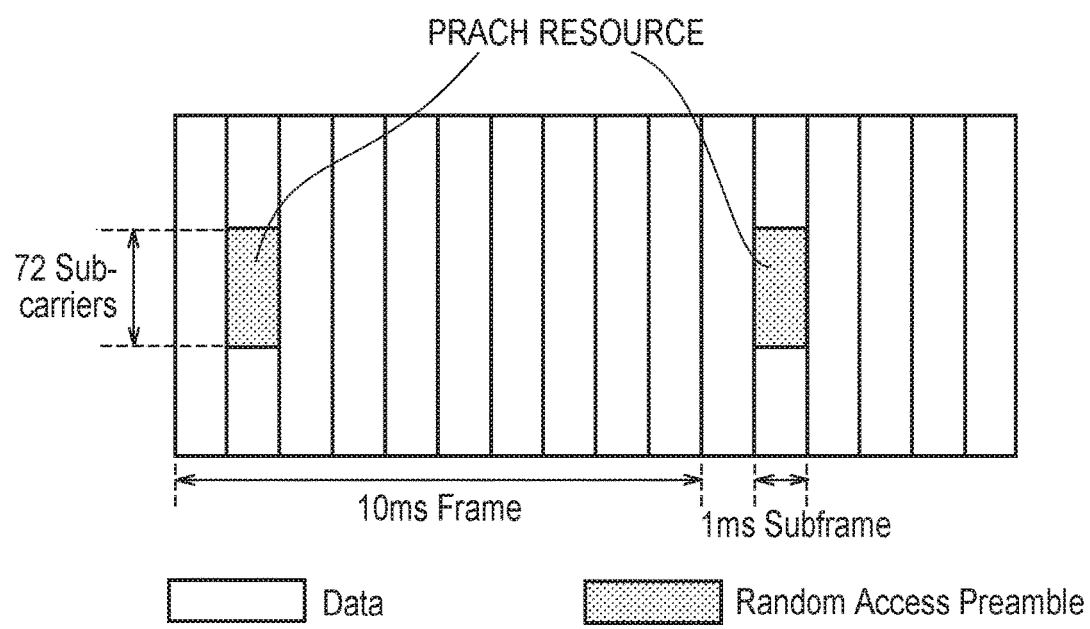
FIG. 6 is a diagram for describing a PRACH resource.

FIG. 6 is a diagram for describing the PRACH resource. The PRACH resource is arranged in every 10 subframes, and is a time-frequency resource including six resource blocks in the center of the frequency direction. The PRACH resource is to transmit the random access preamble from the UE 100, and thus, generally, is not used for transmitting user data. That is, in view of throughput, the PRACH resource is an overhead. Specifically, when an uplink bandwidth is 1.4 MHz (6 RB), an overhead is 10%, and when an uplink bandwidth is 10 MHz (50 RB), an overhead is 0.83%.

(Random Access Procedure)

The UE 100 performs, prior to establishing the RRC connection with the eNB 200, the random access to the eNB 200 in the MAC layer. Prior to the random access, the UE 100 uses a cell search to establish a downlink synchronization with a cell on which to perform the random access. One purpose of the random access is to establish an uplink synchronization with that cell.

The random access has a contention-based random access and a non-contention-based random access. The non-contention-based random access is utilized during handover or the like. The non-contention-based random access during the handover will be described, below.

When the UE 100 that establishes a connection with an eNB 200-1 establishes a connection with an eNB 200-2 which is different from the eNB 200-1, a sequence of the random access preamble is notified from the eNB 200-1 to the UE 100. The sequence of the random access preamble is divided into a group of contention-based sequences and a group of non-contention-based sequences, and a sequence selected from the group of non-contention-based sequences is notified to the UE 100. In the handover, the sequence of the random access preamble selected in the eNB 200-2 is notified through the eNB 200-1 to the UE 100. The UE 100 transmits the random access preamble by the notified sequence, on the PRACH, to the eNB 200-2.

The eNB 200-2 that receives the random access preamble estimates, on the basis of the random access preamble, an uplink delay with the UE 100. Further, the eNB 200-2 determines the time-frequency resource to be assigned to the UE 100. Then, the eNB 200-2 transmits a random access response to the UE 100. The random access response includes a timing correction value (timing advance) based on a result of the delay estimation, information on the determined time-frequency resource, or the like.

In the RRC layer, the UE 100 that receives the random access response transmits, on the basis of the random access response, an establishment completion message of an RRC connection (RRC Connection Reconfiguration Complete message), to the eNB 200. Thus, the random access procedure is completed.

It is noted that when the carrier aggregation is applied, the non-contention-based random access is utilized when the secondary cell is added. Specifically, the eNB 200 that manages the primary cell and the secondary cell notifies the UE 100 that establishes a connection with the primary cell, of the sequence selected from the group of non-contention-based sequences. The UE 100 transmits the random access preamble by the notified sequence, on the PRACH, to the secondary cell. The eNB 200 that receives the random access preamble in the secondary cell transmits the random access response from the primary cell to the UE 100.

(Operation Environment According to Embodiment)

Figure 7:
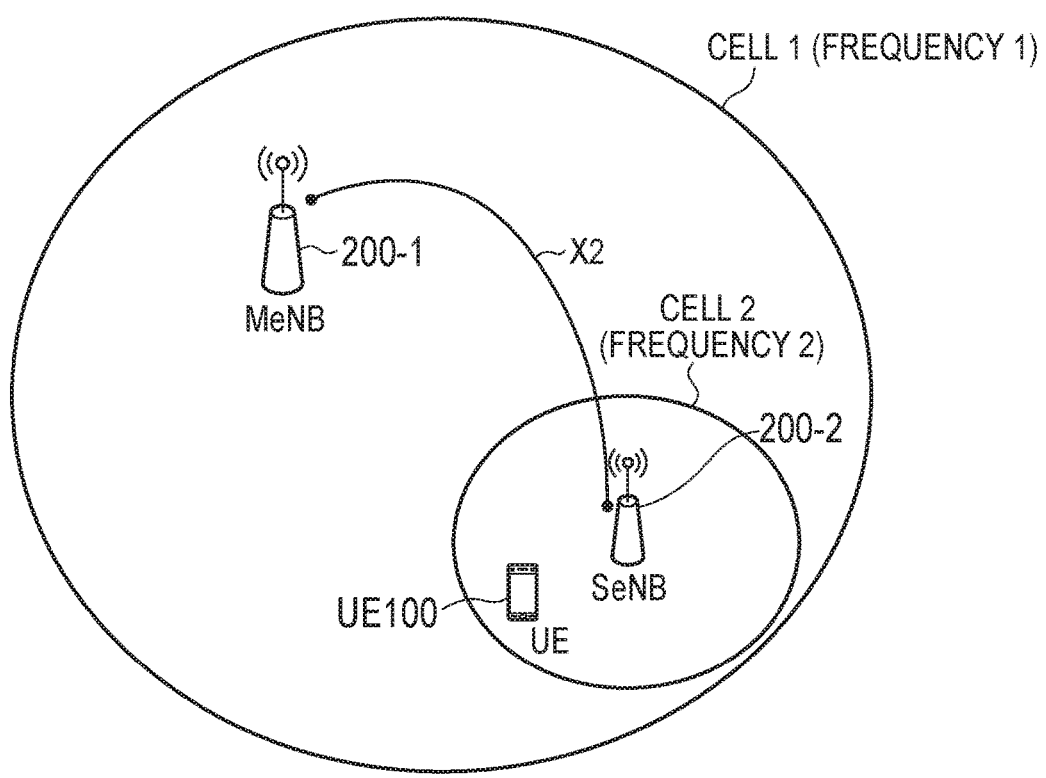
FIG. 7 is a diagram showing an operation environment according to the embodiment.

FIG. 7 is a diagram showing an operation environment according to the embodiment. In the embodiment, assumed is a network configuration where a plurality of cells having a different coverage size are located.

As shown in FIG. 7, a macro eNB (MeNB) 200-1 manages a cell 1 belonging to a frequency 1. A small eNB (SeNB) 200-2 manages a cell 2 belonging to a frequency 2 different from the frequency 1.

The cell 2 is a small cell having a smaller coverage than the cell 1 (macro cell), and may be called a pico cell or a femto cell. The SeNB 200-2 may also be a home eNB (HeNB). The cell 2 is provided within the coverage of the cell 1. The MeNB 200-1 and the SeNB 200-2 have a relationship adjacent with each other, and are mutually connected by an X2 interface.

An LTE system according to the embodiment supports a dual connectivity. A UE 100-1 establishes a dual connectivity with a pair of eNBs 200 (the MeNB 200-1 and the SeNB 200-2). By performing radio communication with the pair of eNBs 200, the UE 100-1 is capable of performing radio communication of a high speed and a large capacity as compared to a case where the UE 100-1 performs radio communication with only one eNB 200.

The dual connectivity is in common with the carrier aggregation in that the UE 100 connects with a plurality of cells (the primary cell and the secondary cell). However, there is a difference in that in the carrier aggregation, the plurality of cells are managed by the identical eNB 200; and in the dual connectivity, the plurality of cells are managed by a different eNB 200.

The MeNB 200-1 performs a mobility control (Mobility management) for the UE 100-1. The MeNB 200-1 establishes an RRC connection with the UE 100-1, and performs a handover control and the like of the UE 100-1. On the other hand, the SeNB 200-2 does not perform the mobility control for the UE 100-1. The SeNB 200-2 establishes the RRC connection with the UE 100-1. Alternatively, the SeNB 200-2 may suffice to establish a connection (L2 connection) with the UE 100-1 up to at least the MAC layer or the RLC layer, and may not necessarily establish an RRC connection (L3 connection).

In the dual connectivity, the UE 100-1 simultaneous uses the cell 1 (primary cell) and the cell 2 (secondary cell) to perform communication with the E-UTRAN 10, and different eNBs 200 (the MeNB 200-1 and the SeNB 200-2) perform the scheduling in each cell.

That is, each of the MeNB 200-1 and the SeNB 200-2 performs the scheduling for the UE 100-1.

(Communication Control Method According to Embodiment)

In the above-described random access procedure, firstly, the random access preamble is transmitted, on the PRACH, from the UE 100. Thus, it is necessary to ensure the time-frequency resource (PRACH resource), used as the PRACH, in each cell, so as to receive the random access preamble. However, there is a problem that when the PRACH resource is ensured, the time-frequency resource (PUSCH resource) used as the PUSCH through which uplink user data is transmitted decreases.

Therefore, the communication control method according to the embodiment improves efficiency in the random access procedure by an inter-cell cooperation.

The communication control method according to the embodiment is used in the LTE system allowing the UE 100 to simultaneously use a plurality of cells. The communication control method includes: a step of transmitting a PRACH securing request to request a securing of a PRACH resource, from the cell 1 (first cell) having a connection with the UE 100, to the cell 2 (second cell) having no connection with the UE 100; a step of securing, by the cell 2 that receives the PRACH securing request, the PRACH resource; and a step of transmitting, a random access preamble by using the PRACH resource, from the UE 100 to the cell 2. Thus, in the embodiment, it is possible to secure, in the cell 2, the PRACH resource only when necessary, without a need of always securing the PRACH resource in the cell 2.

The communication control method according to the embodiment further includes a step of using, by the cell 2, the PRACH resource for an application other than the random access procedure until the cell 2 secures the PRACH resource in response to the PRACH securing request. The application other than the random access procedure is an application of transmitting the user data, for example. In this case, until securing the PRACH resource in response to the PRACH securing request, the cell 2 diverts the PRACH resource to the PUSCH resource. Thus, it is possible to improve the throughput.

The communication control method according to the embodiment further includes: a step of assigning a sequence of the random access preamble from the cell 1 to the UE 100; a step of notifying the cell 2 from the cell 1, of the sequence assigned to the UE 100; a step of transmitting, by the cell 2 that receives, from the UE 100, the random access preamble having a sequence that matches the notified sequence, a first random access response, to the cell 1; and a step of transmitting, by the cell 1 that receives the first random access response, a second random access response, to the UE 100. Thus, it is possible to perform, on the initiative of the cell 1, the random access procedure.

In the embodiment, in the step of notifying the sequence of the random access preamble, when the sequence assigned to the UE 100 is included in the PRACH securing request, the sequence is notified from the cell 1 to the cell 2. Thus, it is possible to reduce signaling.

The communication control method according to the embodiment further includes a step of transmitting a PRACH release request to request a release of the PRACH resource, from the cell 1 to the cell 2 that secures the PRACH resource; and a step of releasing, by the cell 2 that receives the PRACH release request, the PRACH resource. Thus, after the random access procedure to the cell 2 is completed, the cell 2 is capable of using the PRACH resource for an application other than the random access procedure.

In the embodiment, the cell 1 is a macro cell. The cell 2 is one or a plurality of small cells located within the coverage of the macro cell. Further, in the embodiment, the LTE system supports the dual connectivity. The macro cell is managed by the MeNB 200-1 that performs the mobility control on the UE 100. The small cell is managed by the SeNB 200-2.

(Operation Sequence According to Embodiment)

Figure 8:
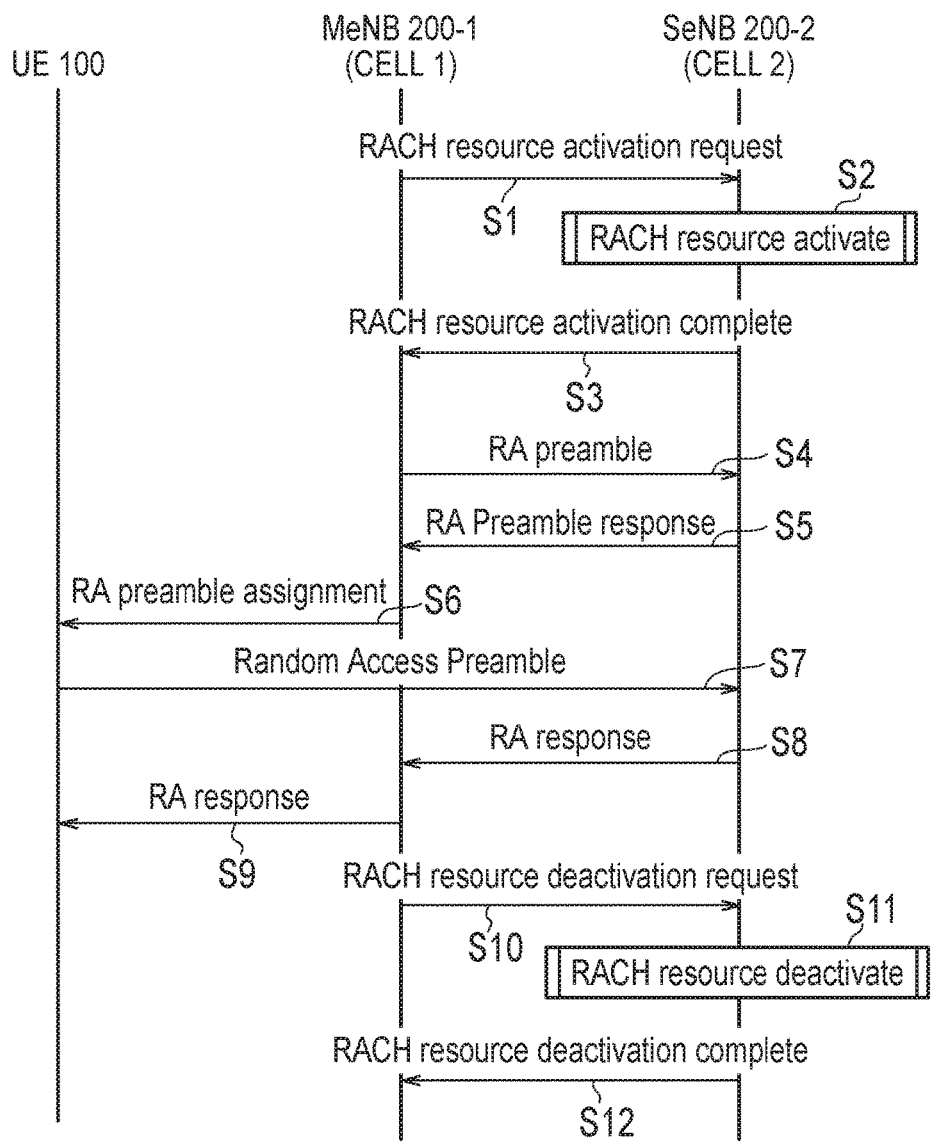
FIG. 8 is an operation sequence chart according to the embodiment.

FIG. 8 is an operation sequence chart according to the embodiment. In an initial state of FIG. 8, the UE 100 establishes a connection with the MeNB 200-1 (cell 1) and does not establish a connection with the SeNB 200-2 (cell 2).

As shown in FIG. 8, in step S1, the MeNB 200-1 transmits the PRACH securing request (RACH resource activation request) for requesting a securing of the PRACH resource, to the SeNB 200-2. The SeNB 200-2 receives the PRACH securing request. As described above, the PRACH resource is a previously defined time-frequency resource (see FIG. 6). Alternatively, the PRACH resource may be variable. In this case, information for specifying the PRACH resource may be included in the PRACH securing request.

In step S2, the SeNB 200-2 secures (activates) the PRACH resource in response to the PRACH securing request.

In step S3, the SeNB 200-2 transmits a response (RACH resource activation complete) indicating that the PRACH resource is secured, to the MeNB 200-1. The MeNB 200-1 receives the response. Upon this response, the MeNB 200-1 starts the random access procedure for the SeNB 200-2.

In step S4, the MeNB 200-1 notifies the SeNB 200-2, of the sequence of the random access preamble assigned to the UE 100. The length of the sequence may be a fixed length and may also be a variable length. The SeNB 200-2 secures the sequence in response to the notification. As described above, step S4 may be performed simultaneously with step S1. It is noted that when there are a plurality of UEs 100, a PRACH resource securing request common to the plurality of UEs and random access preamble information (sequence) for each of the UEs may be separately notified, and when the random access procedures for all the UEs 100 are ended, the PRACH resource may be released.

In step S5, the SeNB 200-2 transmits an acknowledgment (RA Preamble response) indicating that the sequence of the random access preamble is secured, to the MeNB 200-1. The MeNB 200-1 receives the acknowledgment.

It is noted that when the sequence notified from the MeNB 200-1 is being used in the SeNB 200-2, a negative acknowledgment (RA Preamble failure) indicating that it is not possible to secure the sequence may be transmitted from the SeNB 200-2 to the MeNB 200-1. In this case, the sequence securable in the SeNB 200-2 may be included in the negative acknowledgment and notified to the MeNB 200-1.

In step S6, the MeNB 200-1 that receives the acknowledgment (RA Preamble response) notifies the UE 100, of the sequence to be secured in the SeNB 200-2. Further, the MeNB 200-1 may notify the UE 100, of information on the PRACH resource of the SeNB 200-2 (simultaneously with notifying the sequence). It is noted that the MeNB 200-1 or the SeNB 200-2 may notify, by broadcast, the UE 100, of PRACH/RACH configuration information (PRACH Config, RACH-Config Comm) of the SeNB 200-2, and then, may notify, by unicast, the UE 100, of PRACH sequence/resource information (ra-PRACH-MaskIndex, ra-PreambleIndex).

In step S7, on the basis of the PRACH/RACH configuration information and the PRACH sequence/resource information, the UE 100 transmits, on the PRACH, by the designated sequence, the random access preamble to the SeNB 200-2. The SeNB 200-2 receives the random access preamble.

In step S8, in response to receiving, from the UE 100, the random access preamble having the sequence that matches the sequence notified from the MeNB 200-1, the SeNB 200-2 combines the first random access response (RA response) and the RA-RNTI (Random Access-Radio Network Temporary ID) to be transmitted to the MeNB 200-1. The first random access response includes a timing correction value (timing advance) based on a result of the delay estimation, information on the determined time-frequency resource, or the like. The MeNB 200-1 receives the first random access response.

It is noted that when the random access preamble is not received and thus timed-out, the SeNB 200-2 may notify the MeNB 200-1 of a random access failure.

In step S9, the MeNB 200-1 that receives the first random access response transmits the second random access response, to the UE 100. A content of the second random access response is similar to a content of the first random access response except for a destination identifier and a transmission source identifier. The UE 100 that receives the second random access response transmits the establishment completion message (RRC connection Reconfiguration Complete message), to the MeNB 200-1 (SeNB 200-2). Thus, the random access procedure from the UE 100 to the SeNB 200-2 is completed.

In step S10, the MeNB 200-1 transmits the PRACH release request (RACH resource deactivation request) for requesting a release of the PRACH resource, to the SeNB 200-2.

In step S11, the SeNB 200-2 that receives the PRACH release request releases the PRACH resource.

In step S12, the SeNB 200-2 that releases the PRACH resource transmits a notification indicating that the PRACH resource is released (RACH resource deactivation complete), to the MeNB 200-1.

It is noted that step S11 may be performed immediately before step S8. In this case, a notification indicating that the PRACH resource is released may be included in the first random access response.

Summary of Embodiment

As described above, the communication control method according to the embodiment is used in the LTE system allowing the UE 100 to simultaneously use a plurality of cells. The communication control method includes: a step of transmitting a PRACH securing request to request a securing of a PRACH resource, from the cell 1 (first cell) having a connection with the UE 100, to the cell 2 (second cell) having no connection with the UE 100; a step of securing, by the cell 2 that receives the PRACH securing request, the PRACH resource; and a step of transmitting, a random access preamble by using the PRACH resource, from the UE 100 to the cell 2. Thus, it is possible to secure, in the cell 2, the PRACH resource only when necessary, without a need of always securing the PRACH resource in the cell 2. Therefore, it is possible to optimize the random access procedure by an inter-cell cooperation.

First Modification

The above-described embodiment may be changed as below, where the PRACH release request (step S10) and/or the PRACH release request (step S12) may be made unnecessary. In a first modification of the embodiment, the SeNB 200-2 that secures the PRACH resource releases the PRACH resource after an elapse of a predetermined time since securing the PRACH resource in response to the PRACH securing request (step S1). In this case, the PRACH securing request may include information (timer value) specifying the predetermined time.

Second Modification

In the above-described embodiment, a case is described where there is one SeNB 200-2. However, when there are a plurality of SeNBs 200-2 (plurality of cells 2) within a coverage of the MeNB 200-1 (cell 1), the MeNB 200-1 may transmit the PRACH securing request (step S1) and a preamble sequence notification (step S4), to the plurality of SeNBs 200-2. In this case, on the basis of a reception situation of the random access preamble in the plurality of SeNBs 200-2, the MeNB 200-1 may determine the SeNB 200-2 near the UE 100 to decide the most appropriate dual connectivity destination.

Alternatively, when there are a plurality of SeNBs 200-2 (plurality of cells 2) within a coverage of the MeNB 200-1 (cell 1), the MeNB 200-1 may determine, on the basis of a measurement report from the UE 100, the SeNB 200-2 near the UE 100 to decide the most appropriate dual connectivity destination.

Other Embodiments

Figure 9:
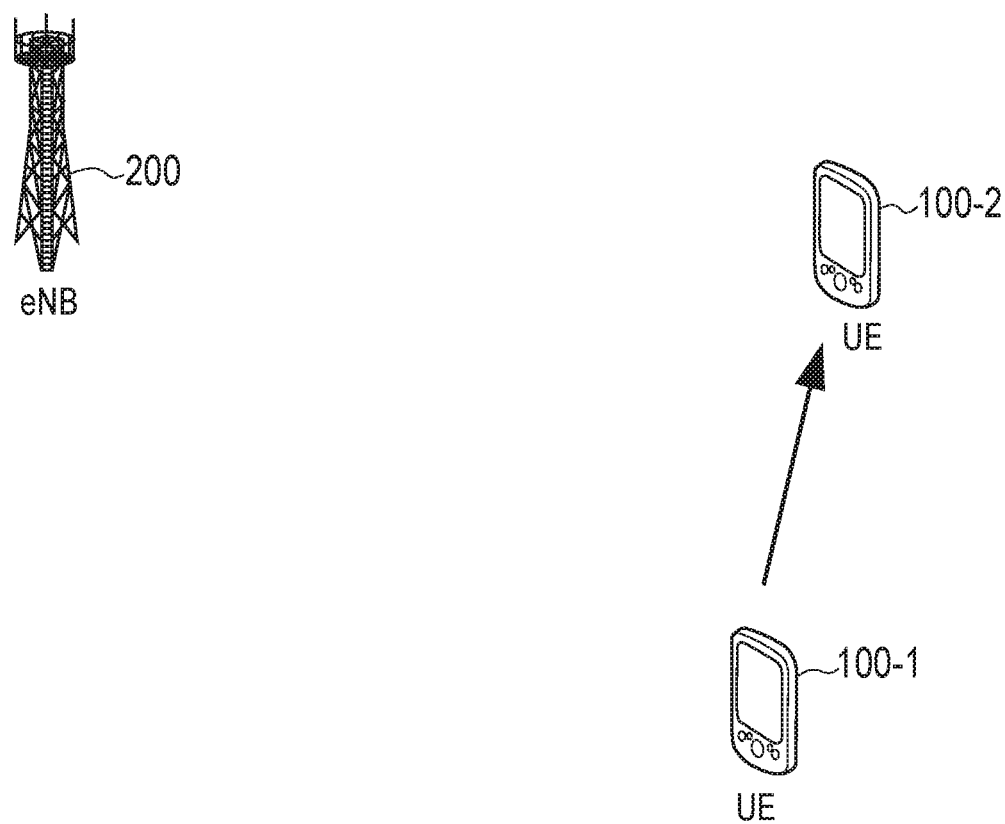
FIG. 9 is a diagram showing an operation environment according to other embodiments.

The above-described operation sequence may be applied to a framework (D2D communication, for example) other than the dual connectivity (or carrier aggregation). In the D2D communication, direct communication is performed, without intervention of a network, among neighborhood UEs. FIG. 9 is a diagram showing an operation environment according to another embodiment. As shown in FIG. 9, the UE 100-1 and a UE 100-2 are located within in a coverage of the eNB 200. The UE 100-1 that establishes a connection with the eNB 200 transmits a broadcast signal (a synchronization signal or a discovery signal) for establishing a connection with the UE 100-2. In such an operation environment, the above-described operation sequence may be applied. Specifically, the "MeNB 200-1" in the above-described operation sequence may be replaced by the "eNB 200", the "UE 100" may be replaced by the "UE 100-1", the "SeNB 200-2" may be replaced by the "UE 100-2", the "random access preamble" may be replaced by a "broadcast signal of D2D communication", and the "PRACH resource" may be replaced by a "broadcast signal resource of D2D communication".

In the above-described embodiments, as one example of cellular communication system, the LTE system is described; however, the present invention is not limited to the LTE system, and the present invention may be applied to systems other than the LTE system.

It is noted that the entire content of Japanese Patent Application No. 2013-224461 (filed on Oct. 29, 2013) is incorporated in the present specification by reference.

INDUSTRIAL APPLICABILITY

According to the present invention, it is possible to improve efficiency in a random access procedure by an inter-cell cooperation.

The invention claimed is:

1. A communication control method used in a mobile communication system in which a user terminal is capable of simultaneously using a plurality of cells, comprising the steps of:
   transmitting a PRACH securing request to request a securing of a PRACH resource, from a first cell having a connection with the user terminal to a second cell having no connection with the user terminal;
   securing, by the second cell that receives the PRACH securing request, the PRACH resource;
   assigning a sequence of a random access preamble from the first cell to the user terminal;
   notifying, from the first cell, the second cell of the sequence to be assigned to the user terminal;
   transmitting the random access preamble by using the PRACH resource, from the user terminal to the second cell;
   transmitting, by the second cell that receives, from the user terminal, the random access preamble having a sequence that matches the notified sequence, a first random access response, to the first cell; and
   transmitting, by the first cell that receives the first random access response, a second random access response, to the user terminal.

2. The communication control method according to claim 1, wherein
   in the step of notifying the sequence, by including the sequence assigned to the user terminal in the PRACH securing request, the sequence is notified from the first cell to the second cell.

3. A base station managing a first cell having a connection with a user terminal in a mobile communication system in which the user terminal is capable of simultaneously using a plurality of cells, the first base station comprising:
   a transmitter configured to transmit a PRACH securing request to request a securing of a PRACH resource, to a second cell having no connection with the user terminal;

a controller configured to assign a sequence of a random access preamble to the user terminal; and a receiver, wherein the transmitter is configured to notify the second cell of the sequence to be assigned to the user terminal;

the receiver is configured to receive a first random access response from the second cell, the first random access response being transmitted by the second cell that receives, from the user terminal, the random access preamble having a sequence that matches the notified sequence; and the transmitter is configured to transmit a second random access response to the user terminal.

4. A second base station managing a second cell having no connection with a user terminal in a mobile communication system in which the user terminal is capable of simultaneously using a plurality of cells, the second base station comprising:

a receiver configured to receive a PRACH securing request that requests a securing of a PRACH resource, from a first cell having a connection with the user terminal;

a controller configured to secure the PRACH resource in the second cell, in response to reception of the PRACH securing request; and a transmitter, wherein the receiver is configured to receive a sequence to be assigned from the first cell to the user terminal, from the first cell, the receiver is configured to receive a random access preamble by using the PRACH resource, from the user terminal, the transmitter is configured to transmit a first random access response to the first cell, when the received random access preamble having a sequence that matches the received sequence.

* * * * *